(12) United States Patent
Stanton et al.

(10) Patent No.: US 6,597,773 B2
(45) Date of Patent: Jul. 22, 2003

(54) SYSTEM FOR MANAGING TELECOMMUNICATIONS INFRASTRUCTURE

(75) Inventors: Frank L. Stanton, Hicksville, NY (US); Hugh O'Kane, Jr., Locust Valley, NY (US)

(73) Assignee: Lexent Inc., New York, NY (US)

( * ) Notice: Subject to any disclaimer, the term of this patent is extended or adjusted under 35 U.S.C. 154(b) by 360 days.

(21) Appl. No.: 09/759,562

(22) Filed: Jan. 11, 2001

(65) Prior Publication Data

US 2002/0099682 A1 Jul. 25, 2002

(51) Int. Cl.$^7$ .............................................. H04M 15/00
(52) U.S. Cl. ............................ 379/112.05; 379/112.06; 379/112.08
(58) Field of Search ......................... 379/93.25, 112.05, 379/112.06, 112.08; 707/1, 10, 104.1, 200; 709/201, 217, 223, 227

(56) References Cited

U.S. PATENT DOCUMENTS

| | | | |
|---|---|---|---|
| 4,707,848 A | 11/1987 | Durston et al. ................. | 379/1 |
| 4,754,326 A | 6/1988 | Karam et al. | |
| 4,799,156 A | 1/1989 | Shavit et al. .................. | 705/26 |
| 4,847,894 A | 7/1989 | Chanvin et al. ............. | 379/104 |
| 4,922,514 A | 5/1990 | Bergeron et al. ............... | 379/6 |
| 5,416,833 A | 5/1995 | Harper et al. ................ | 379/201 |
| 5,548,631 A | 8/1996 | Krebs et al. ................... | 379/58 |
| 5,581,461 A | 12/1996 | Coll et al. | |
| 5,608,720 A | 3/1997 | Biegel et al. | |
| 5,611,048 A | 3/1997 | Jacobs et al. | |
| 5,642,100 A | 6/1997 | Farmer | |
| 5,687,212 A | 11/1997 | Kinser, Jr. et al. ............. | 379/10 |
| 5,696,906 A | 12/1997 | Peters et al. | |

(List continued on next page.)

OTHER PUBLICATIONS

Corn, Phyllis A. et al., "An Autonomous Distributed Expert System for Switched Network Maintenance", IEEE Global Telecommunications Conference, 1988, and Exhibition. 'Communication for the Information Age.' Nov. 28–Dec. 1, 1988, pp. 1530–1537, vol. 3.

John, T.C. et al., "Integrated Maintenance for Communication Networks—An AT & T Solution", IEEE Global Telecommunications Conference, 'Countdown to the New Millennium' Dec. 2–5, 1991, pp. 654–657, vol: 1.

*Primary Examiner*—Curtis Kuntz
*Assistant Examiner*—Barry W Taylor
(74) *Attorney, Agent, or Firm*—St. Onge Steward Johnston & Reens LLC

(57) ABSTRACT

A system for managing telecommunications infrastructure is provided, which system includes a computer, a sites database having stored thereon site information relating to a plurality of telecommunications sites, a schedules database having stored thereon schedule maintenance plans relating to a plurality of telecommunications sites, and a pathways database having stored thereon pathway ownership data indicative of which pathways in and between telecommunications sites are owned by which users and which pathways are available for use. In one aspect, software is provided for allowing a plurality of users to access and update the sites database so as to facilitate the management of telecommunications infrastructure by allowing a user to access the most current information available regarding a plurality of telecommunications sites, even if it was another user which was the last to update the sites. In another aspect, software is provided for maintaining the schedules database and for allowing the plurality of users to schedule time periods for access to a plurality of sites so as to avoid scheduling conflicts with the others of the plurality of users. In yet another aspect software is provided for managing the pathway ownership data stored on the pathways database, and for facilitating the planning or pathways for running cables for the plurality of users.

36 Claims, 10 Drawing Sheets

U.S. PATENT DOCUMENTS

| | | | |
|---|---|---|---|
| 5,761,432 A | 6/1998 | Bergholm et al. | 709/226 |
| 5,764,955 A | 6/1998 | Doolan | |
| 5,774,689 A | 6/1998 | Curtis et al. | |
| 5,862,388 A | 1/1999 | Danneels et al. | |
| 5,875,242 A | 2/1999 | Glaser et al. | |
| 5,881,131 A | 3/1999 | Farris et al. | 379/27 |
| 5,883,948 A | 3/1999 | Dunn | 379/210 |
| 5,884,284 A | 3/1999 | Peters et al. | |
| 5,901,208 A * | 5/1999 | Jabbarnezhad | 379/112.05 |
| 5,905,951 A | 5/1999 | Orosz | |
| 5,920,846 A | 7/1999 | Storch et al. | |
| 5,930,764 A | 7/1999 | Melchione et al. | |
| 5,930,779 A | 7/1999 | Knoblock et al. | |
| 5,991,728 A | 11/1999 | DeBusk et al. | 705/2 |
| 5,991,759 A | 11/1999 | Knoblock et al. | |
| 5,999,179 A * | 12/1999 | Kekic et al. | 345/734 |
| 6,023,699 A | 2/2000 | Knoblock et al. | |
| 6,028,602 A | 2/2000 | Weidenfeller et al. | |
| 6,067,030 A | 5/2000 | Burnett et al. | |
| 6,067,525 A | 5/2000 | Johnston et al. | |
| 6,366,581 B1 * | 4/2002 | Jepsen | 370/397 |
| 6,498,839 B2 * | 12/2002 | Rojas | 379/112.01 |

* cited by examiner

MANHOLE SCHEDULE

| MANHOLE | FEB. 16 | | | FEB. 17 | | | FEB. 18 | | |
|---|---|---|---|---|---|---|---|---|---|
| | 0-8 | 8-16 | 16-24 | 0-8 | 8-16 | 16-24 | 0-8 | 8-16 | 16-24 |
| BOS-300 00B-035 | | ▨ | ▨ | | ▨ | ▨ | | ▨ | |
| BOS-300 00B-040 | | ▧ | | | | | | ▧ | |
| BOS-300 00B-045 | | ▨ | ▨ | | ▨ | ▨ | | ▨ | ▨ |

| COLOR | MEANING |
|---|---|
| ▨ | MANHOLE IN USE FOR ENTIRE SHIFT |
| ▧ | MANHOLE IN USE FOR PORTION OF SHIFT |
| | MANHOLE AVAILABLE FOR ENTIRE SHIFT |

FIG. 5

SECTOR DISPLAY

BOS-300 0B1

| 000 | 010 | 020 | 030 | 040 | 050 | 060 | 070 | 080 | |
|-----|-----|-----|-----|-----|-----|-----|-----|-----|-----|
| 100 | 110 | 120 | | 140 | 150 | 160 | 170 | 180 | 190 |
| 200 | 210 | 220 | 230 | 240 | 250 | 260 | 270 | 280 | 290 |
| 300 | 310 | 320 | | 340 | 350 | | 370 | 380 | |
| | 410 | 420 | 430 | 440 | 450 | 460 | 470 | 480 | 490 |
| 500 | 510 | 520 | 530 | 540 | 550 | 560 | | | 590 |
| 600 | 610 | 620 | 630 | | | 660 | 670 | 680 | |
| 700 | 710 | 720 | 730 | 740 | 750 | 760 | 770 | 780 | 790 |
| | 820 | | 830 | 840 | 850 | 860 | | 880 | 890 |
| 900 | 910 | 920 | 930 | | | 960 | 970 | 980 | 990 |

FIG. 6

SYSTEM FOR MANAGING TELECOMMUNICATIONS INFRASTRUCTURE

FIELD OF THE INVENTION

The present invention relates to management and maintenance of telecommunications infrastructure, and more particularly to an automated system for managing a plurality of remotely located sites owned, operated and/or serviced by a plurality of system users.

BACKGROUND OF THE INVENTION

Telecommunications companies often have a large number of remotely located equipment sites. These sites typically include telecommunications equipment, telecommunications cables, and pathways for running cables. These pathways may be occupied by cables or other equipment, may be damaged, destroyed or otherwise unable to receive cables, or may be unoccupied and ready to receive cables.

The telecommunications equipment sites are frequently numerous, remote from the main office of the telecommunications company and/or unmanned and undergo frequent changes. Accordingly, telecommunications companies often lose track and control over what equipment and cables, or which pathways for running cables, are installed, in use, damaged or available for use at any particular site.

These problems are exacerbated when two or more telecommunications companies jointly own, operate and/or service telecommunications equipment at the same equipment sites, as is often the case with public infrastructure sites, such as manholes. Each manhole may be maintained by many telecommunications companies, each one having telecommunications equipment and/or cables located in the same manhole, and each one owning the rights to different pathways within the manhole. In such cases, it is extremely difficult for one telecommunications company to know what equipment and cables are present at any given site, particularly when such equipment and cables have been installed by other telecommunications companies.

Moreover, conflicts may frequently occur when two or more telecommunications companies desire to access the same site at the same time. For example, manholes typically have very limited space, and it is often impossible for more than one worker to operate in the manhole at a time. Thus, if one telecommunications company has a worker operating in a manhole, and a work team from another company arrives at the site seeking to access the same manhole, problems may occur relating to who should have priority in accessing the site. This is particularly troublesome when large scale construction projects involving multiple telecommunications companies are under way.

What is desired, therefore, is a system for managing telecommunications infrastructure which automatically manages a plurality of remotely located sites, which monitors what equipment and cables, or which pathways for running cables, are installed, in use, damaged or available for use at any particular site, which automatically manages sites owned, operated and/or serviced by a plurality of system users, and which automatically maintains access schedules for the sites so as to minimize conflicts that may occur when two or more telecommunications companies desire to access the same site.

SUMMARY OF THE INVENTION

Accordingly, it is an object of the present invention to provide a system for managing telecommunications infrastructure which automatically manages a plurality of remotely located sites.

Another object of the present invention is to provide a system for managing telecommunications infrastructure having the above characteristics and which monitors what equipment and cables, or which pathways for running cables, are installed, in use, damaged or available for use at any particular site.

A further object of the present invention is to provide a system for managing telecommunications infrastructure having the above characteristics and which automatically manages sites owned, operated and/or serviced by a plurality of system users.

Still another object of the present invention is to provide a system for managing telecommunications infrastructure having the above characteristics and which automatically maintains access schedules for the sites so as to minimize conflicts that may occur when two or more telecommunications companies desire to access the same site.

These and other objects of the present invention are achieved by provision of a system for managing telecommunications infrastructure including a computer and a communications link between the computer and a plurality of users. In one aspect, the system includes a sites database accessible by the computer, the sites database having stored thereon site information relating to a plurality of telecommunications sites, and being accessible by a site identifier. Software executing on the computer receives from the plurality of users through the communications link a site identifier indicative of a site of interest, and retrieves from the sites database and transmits to the plurality of users through the communications link information relating to the site of interest. Software executing on the computer is also provided for receiving from the plurality of users through the communications link a site update for a site which has been updated, and for updating the site information relating to the updated site on the sites database. Thus, the system facilitates the management of telecommunications infrastructure by allowing a user to access the most current information available regarding a plurality of telecommunications sites, even if it was another user which was the last to update the sites.

Preferably, the site information may comprise graphical representations of the current status of the plurality of telecommunications sites, photographs of the plurality of telecommunications sites, or data indicative of the current status of the plurality of telecommunications sites. In the last case, the system most preferably includes software for generating, based upon the data indicative of the current status of the plurality of telecommunications sites, graphical representations of the current status of the plurality of telecommunications sites.

Also preferably, the site information may comprise an indication of which equipment and cables are installed at the plurality of telecommunications sites and/or an indication of which pathways are in use, damaged or available at the plurality of telecommunications sites.

In another aspect, the system includes a schedules database accessible by the computer, the schedules database having stored thereon schedule maintenance plans relating to a plurality of telecommunications sites, and being accessible by a site identifier. Software executing on the computer receives from the plurality of users through the communications link a work order for a site to be accessed, the work order comprising a site identifier indicative of the site to be accessed. Software executing on the computer then retrieves from the schedules database and transmits to the plurality of users through the communications link a schedule maintenance plan relating to the site to be accessed. Software executing on the computer is also provided for receiving from the plurality of users through the communications link an indication of a desired time period for access to the site to be accessed. Software executing on the computer then, if no scheduling conflict is determined to exist, updates the schedule maintenance plan relating to the site to be accessed on the schedules database to reflect the indication of the desired time period for access to the site to be accessed.

Preferably, software executing on the computer is provided for receiving from the plurality of users through the communication link documentation relating to the work order. It is also preferable that the work order includes an indication of whether the work order relates to an emergency situation, and the system further includes an emergencies database accessible by the computer, the emergencies database having stored thereon emergency notifications relating to a plurality of telecommunications sites, and being accessible by a site identifier. In such a case, software executing on the computer is provided for, if the work order relates to an emergency situation, updating the emergency notification on the emergencies database relating to the site identifier included in the work order to reflect the emergency situation.

Preferably, the schedule maintenance plans comprise graphical representations of scheduled time periods when the plurality of telecommunications sites are available for access, or data indicative of scheduled time periods when the plurality of telecommunications sites are available for access. In the latter case, the system most preferably includes software for generating, based upon the data indicative of scheduled time periods when the plurality of telecommunications sites are available for access, graphical representations of scheduled time periods when the plurality of telecommunications sites are available for access.

In yet another aspect, the system includes a pathways database accessible by the computer, the pathways database having stored thereon pathway ownership data indicative of which pathways in and between telecommunications sites are owned by which users and which pathways are available for use, the pathway ownership data being accessible by a user identifier. Software executing on the computer receives from the plurality of users through the communications link a user identifier for a particular user. Software executing on the computer then retrieves from the pathways database pathway ownership data indicative of which pathways are owned by the particular user and which pathways owned by the particular user are available for use. Software executing on the computer is also provided for receiving from the plurality of users through the communications link an indication of a desired start site and a desired end site for a cable to be run. Software executing on the computer next calculates and transmits to the plurality of users through the communications link, based upon the desired start site, the desired end site, and the retrieved pathway ownership data, at least one pathway for running the cable, and receives an indication from the plurality of users through the communications link of a selected pathway for running the cable. Finally, software executing on the computer updates the pathway ownership data on the schedules database to reflect the selected pathway for running the cable.

In one embodiment, the software executing on the computer for calculating and transmitting to the plurality of users through the communications link, based upon the desired start site, the desired end site, and the retrieved pathway ownership data, at least one pathway for running the cable, and for receiving an indication from the plurality of users through the communications link of a selected pathway for running the cable comprises software executing on the computer for transmitting to the plurality of users at least one site to which the cable can be run from the desired start site, and for receiving from the plurality of users an indication of a selected next site, and software executing on the computer for, if the selected end site has not been reached, transmitting to the plurality of users at least one site to which the cable can be run from the desired start site, for receiving from the plurality of users an indication of a selected next site, and for repeating such transmission and receipt until the selected end site has been reached.

The invention and its particular features and advantages will become more apparent from the following detailed description considered with reference to the accompanying drawings.

BRIEF DESCRIPTION OF THE DRAWINGS

FIG. 5 is a schematic diagram illustrating a manhole schedule which may comprise a portion of the schedule information stored on the schedule database of the system for managing telecommunications infrastructure of FIG. 1;

FIG. 6 is a schematic diagram illustrating a sector of sites and the sites making up such sector;

DETAILED DESCRIPTION OF THE INVENTION

Figure 1:
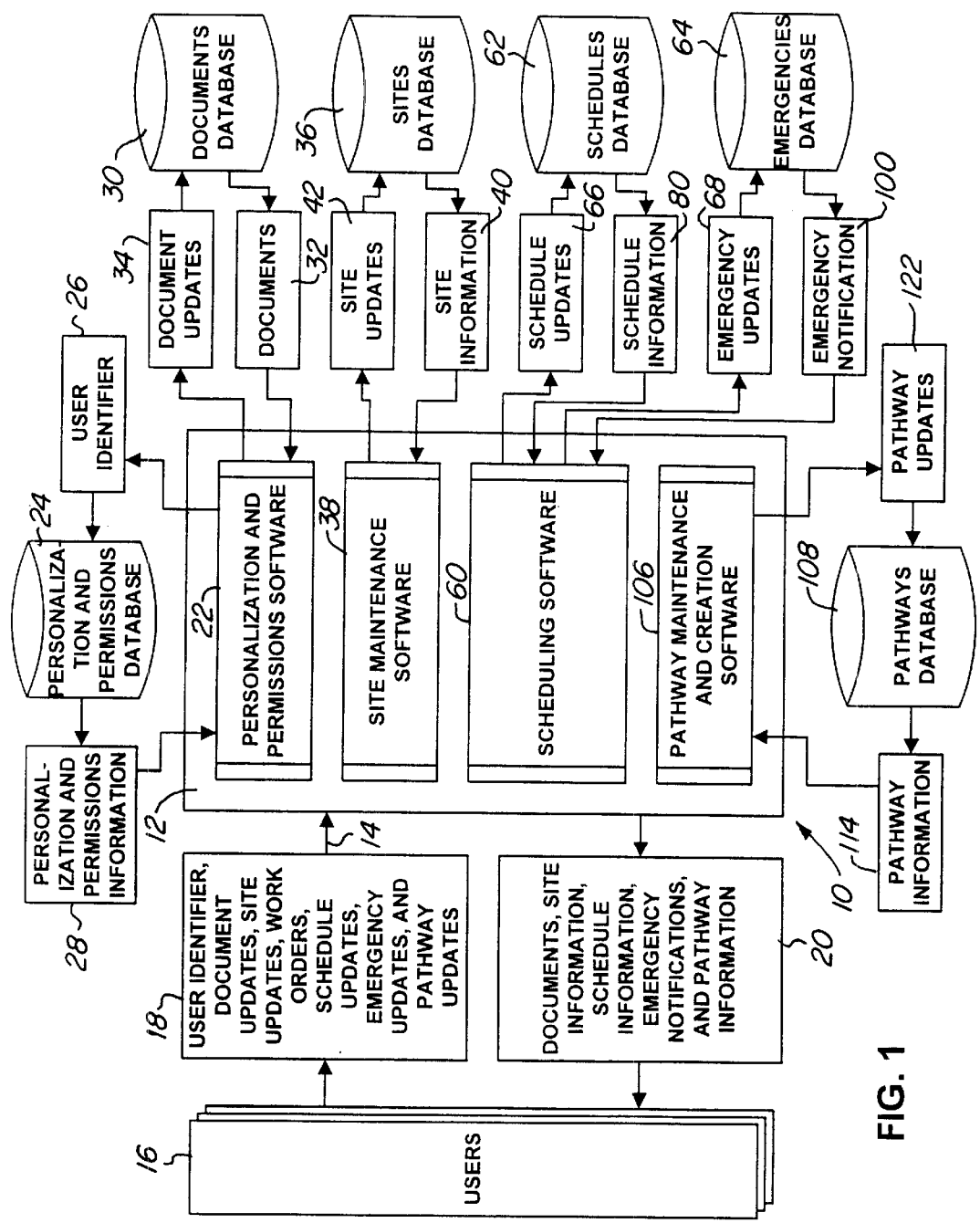
FIG. 1 is a block diagram illustrating a system for managing telecommunications infrastructure in accordance with the present invention.

Referring first to FIG. 1, a system 10 for managing telecommunications infrastructure in accordance with the present invention is shown. System 10 includes a conventional server-computer 12 connected through a network 14, such as the Internet, intranet, wide area network, local area network or some other network system, to a plurality of users 16, which may be operating user computers of workstations. Through this arrangement, users 16 may transmit information 18, such as user identifiers, document updates, site updates, work orders, schedule updates, emergency updates and pathway updates, to computer 12, and computer 12 may transmit information 20, such as documents, site information, schedule information, emergency notifications and pathway information, to user 16, as described in detail below. Typically, users 16 will comprise telecommunications companies which own, operate and/or service infrastructure sites managed by system 10.

System 10 contemplates organizing data in a plurality of databases, which can be located at different sites and accessed through network 14, or can comprise a part of computer 12. In addition, system 10 has executing thereon software, which may comprise a plurality of separate programs or applications (as shown in the Figures for clarity), or may comprise a single program or application performing varying functions. The specific databases and software employed is described in detail below.

In one aspect, system 10 includes personalization and permissions software 22 and a personalization and permissions database 24 accessible by computer 12 and having stored thereon, by user identifier, personalization and permissions information. Personalization and permissions software 22 receives a user identifier 26 from user 16 at logon, which user identifier is unique to each user company 16, and may or may not be unique to each individual person at each user company 16. Software 22 then queries personalization and permissions database 24 by user identifier 26 to retrieve personalization and permissions information 28 for that user company 16.

Personalization and permissions information 28 may comprise, for example, various indications of which databases, or portions thereof, the particular user 16 can view, edit, save to, etc., which operations the particular user 16 is allowed to perform, and a variety of other security related information and indicators relating to the particular user 16. Personalization and permissions information 28 may also comprise, for example, various indicators and information concerning the personalized preferences of the particular user 16, such as a desired format for viewing web pages on system 10, the desired communication protocols with system 10, desired methods for receiving confirmations of various actions, and the like. System 10 thus affords a personalized and secure experience for each of users 16.

In a related aspect, system 10 may be provided with a documents database 30 accessible by computer 12, having stored thereon a plurality of documents. Documents 32 may be retrieved from documents database 30 for display to users 16, and documents stored on documents database 30 may be added to and/or modified by users 16 via document updates 34. Preferably, documents database 30 is tied to personalization and permissions software 22 in that only certain documents may be available for viewing and/or editing by any given user depending on the personalization and permissions information 28 retrieved from personalization and permissions database 24. For example, a particular user 16 may specify that a document stored on documents database 30 be only viewable by it, or that the document may be viewable by other, or all, users, but only capable of being edited by it. System 10 thus provides for the secure storage, and/or dissemination of documents by users 16.

Figure 2:
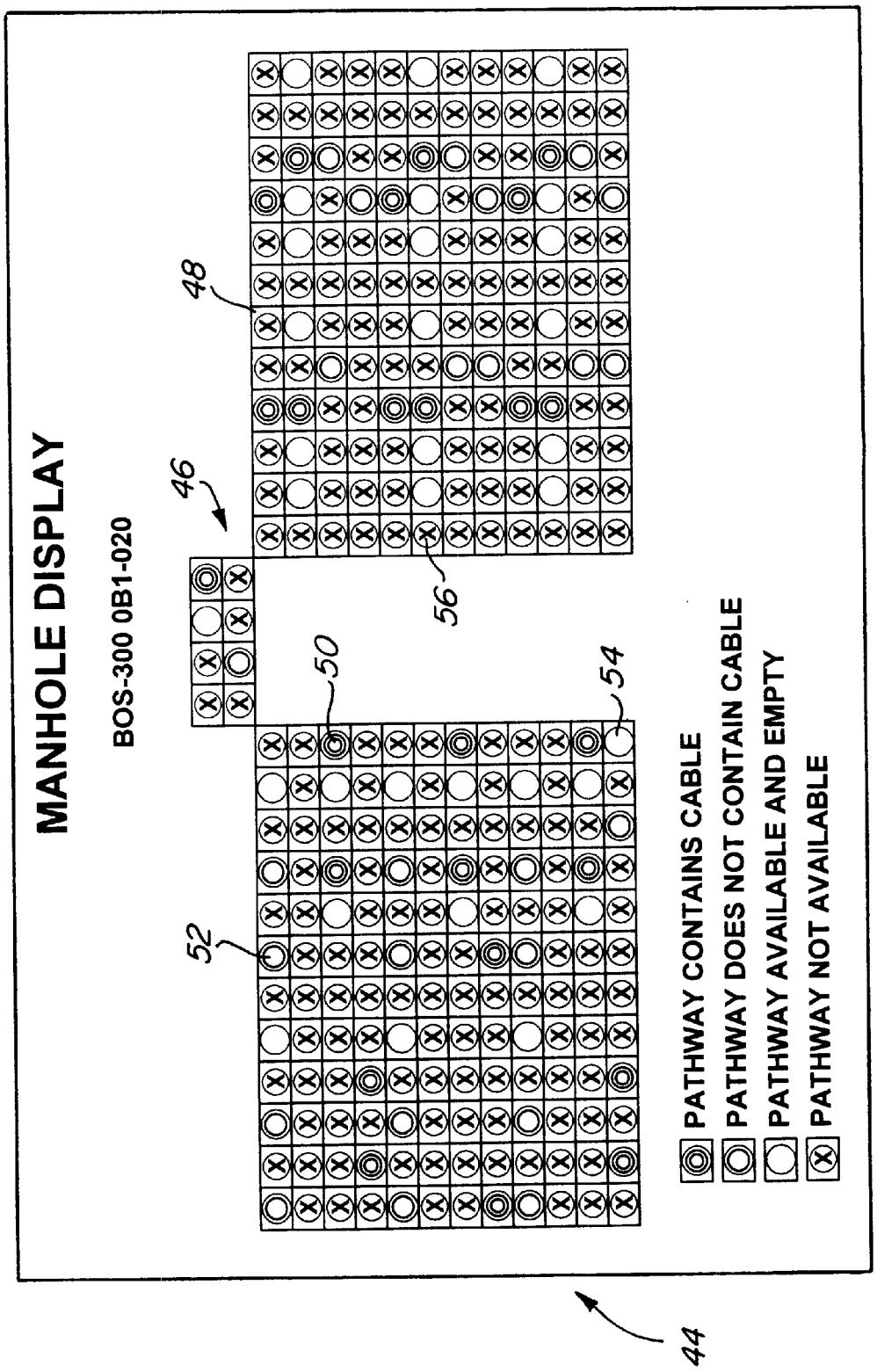
FIG. 2 is a schematic diagram illustrating a manhole display which may comprise a portion of the site information stored on the sites database of the system for managing telecommunications infrastructure of FIG. 1.
Figure 3:
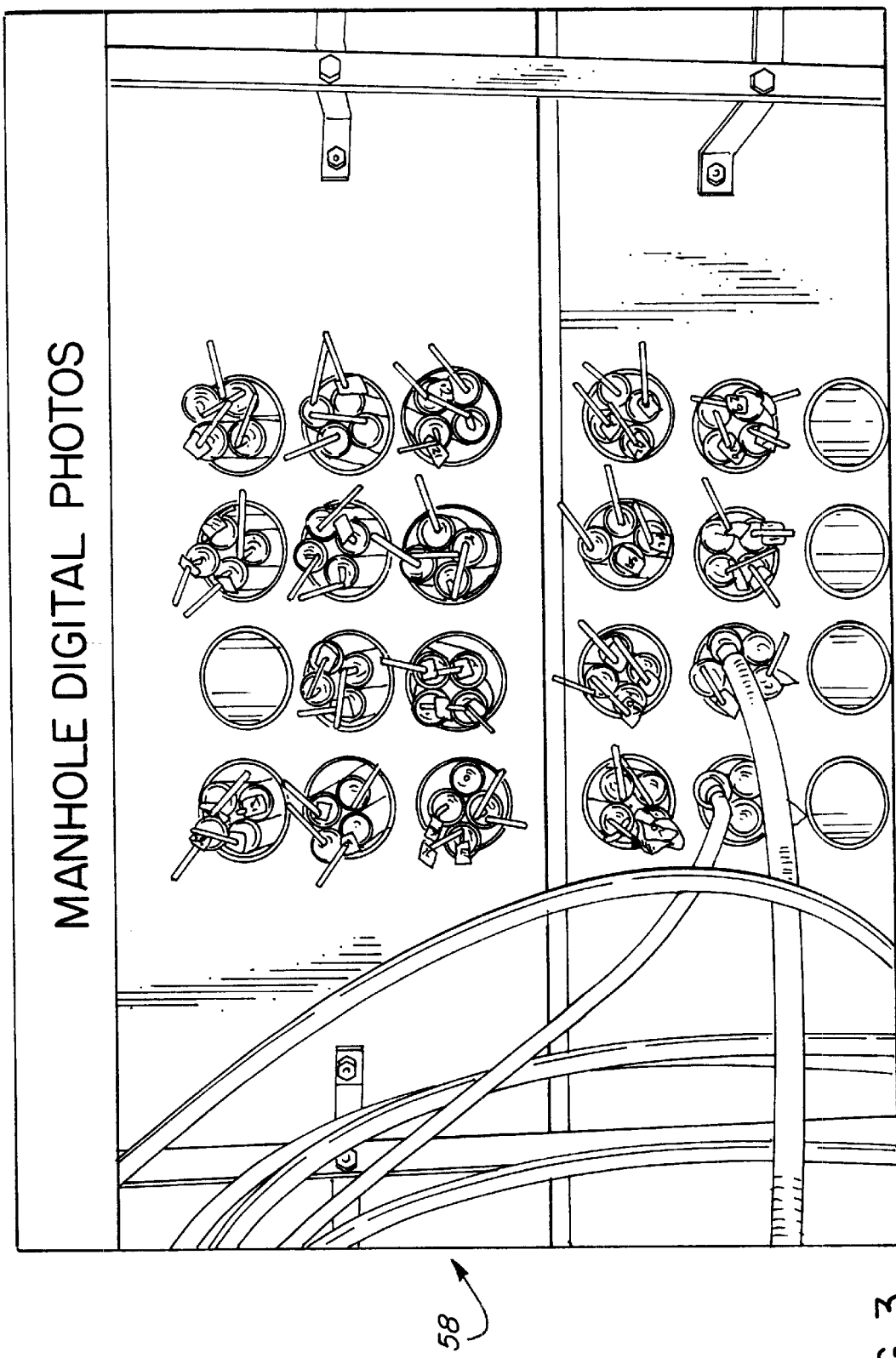
FIG. 3 is a digital photograph of a manhole which may comprise a portion of the site information stored on the sites database of the system for managing telecommunications infrastructure of FIG. 1.

Referring now to FIGS. 1 through 3, another aspect of the invention involves the ability to keep track of and control over a plurality of telecommunications equipment sites. To this end, a sites database 36 accessible by computer 12 and site maintenance software 38 are provided. Sites database 36 has stored thereon site information 40 relating to a plurality of sites, such as indications of which equipment and cables, or which pathways for running cables, are installed, in use, damaged or available for use at any particular site. The site information 40 is stored and retrievable by site, and is kept current by site updates 42 entered by users 16 when work or an inspection is performed at the site.

Site information 40 may comprise data which may be retrieved and displayed to user 16 by site maintenance software 38 in relatively raw data form, or may be interpreted by site maintenance software 38 and displayed to user in a more user friendly form. For example, and with reference to FIG. 2, the site in question may be a manhole, and site information 40 may relate to the status of various pathways within the manhole. In such a case, site maintenance software 38 may retrieve site information 40 from sites database 36, and convert it into a graphical, user-friendly display 44 which is transmitted to user 16. For example, display 44 comprises an indication of a typical manhole configuration 46, which itself comprises a plurality of pathways 48. Display 44 includes indications as to the status of each of pathways 48, such as whether the pathway contains cable 50, whether the pathway does not contain cable 52, whether the pathway is available and empty 54, or whether the pathway is not available 56. It should be understood that site updates 42 also may be entered in relatively raw data form, or may be received from user 16 in a more user friendly form similar to that presented above, and then interpreted by site maintenance software 38 before being stored on sites database 36.

Site information 40 may also comprise graphical representations of the sites, such as digital photographs 58 (see FIG. 3) taken by users 16 when the site is updated or inspected, or periodically taken by digital cameras stationed at the site itself. In another embodiment, site maintenance software 38 may be in communication with a web-cam (not shown) or the like to allow system 10 to provide real-time images of the site. In this case, the web-cam is preferably movably mounted and controlled by system 10 such that a user 16 of system 10 can rotate or position the web-cam to obtain a plurality of views of the site.

As will be appreciated by one skilled in the art, this aspect of the invention is particularly useful when two or more telecommunications companies jointly own, operate and/or service telecommunications equipment at the same equipment sites, as it allows any of users 16 to update sites database 36, and allows any of users 16 to view updates even if those updates were made by other users. Thus, all users can easily and remotely determine the status of any site, and what equipment and cables are present at the site, at any given time.

Figure 4:
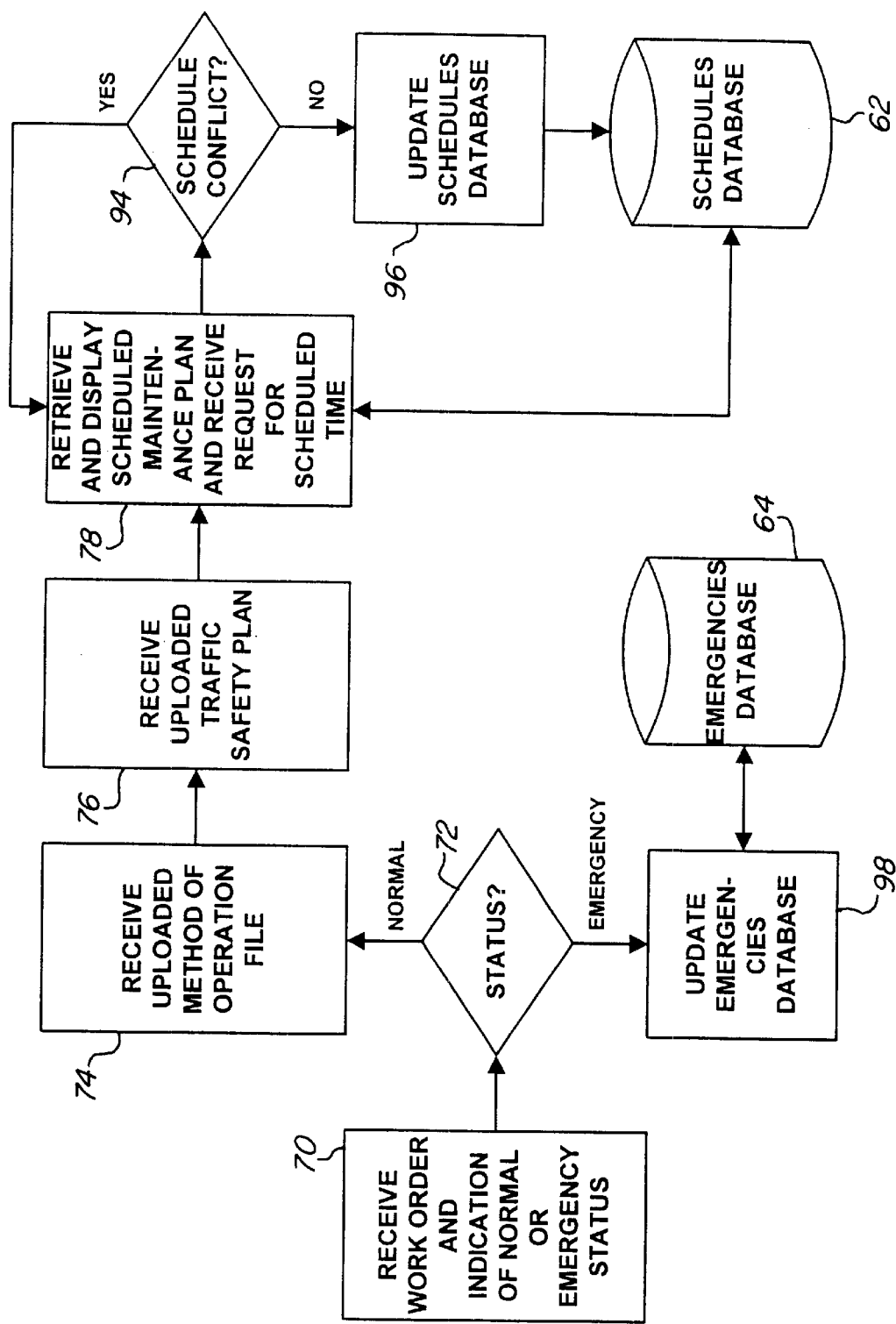
FIG. 4 is a block diagram illustrating the operation of the scheduling software of the system for managing telecommunications infrastructure of FIG. 1.

Referring now to FIGS. 1, 4 and 5, in another aspect, system 10 provides a mechanism by which a plurality of telecommunications companies may schedule access to a plurality of telecommunications sites such that conflicts when two or more telecommunications companies desire to access the same site at the same time may be avoided. In a related aspect, system 10 provided a convenient mechanism for monitoring when an emergency, such as a mistakenly cut cable, or another event has occurred which might interfere with a system user's access to a telecommunications site. To these ends, system 10 includes scheduling software 60 executing on computer 12, along with schedules database 62 and emergencies database 64, which have stored thereon schedule information and emergency information respectively.

Schedules database 62 and emergencies database 64 are updated by work orders received from users 16 and processed by scheduling software 60 to create schedule updates 66 and emergency updates 68, as shown in more detail in FIG. 4. Scheduling software 60 first receives, at 70, a work order relating to a particular telecommunications site and an indication of whether the work order is of normal status or whether it relates to an emergency situation. If it is determined, at 72, that the work order is of normal status, scheduling software 60 prompts user 16 to upload, and receives from user 16, all required documentation relating to the work order, such as a method of operation file, at 74, and/or a traffic safety plan, at 76. Once scheduling software 60 receives all required documentation, it, at 78, retrieves from schedules database 62 and displays to user 16 the scheduled maintenance plan for the site in question, and prompts user 16 to enter, and receives from user 16, a request for access to the site at a particular time.

The scheduled maintenance plan for the site in question is preferably in a user-friendly graphical format so that user 16 can quickly and easily determine an appropriate time for scheduling access to the site in question. For example, the scheduled maintenance plan 80 shown in FIG. 5 shows scheduled access times for a plurality of manholes 82 for a plurality of dates 84. Each date 84 may be broken down into a number of shifts 86 (typically three per day), with an indication of whether the manhole is in use for the entire shift 88, whether the manhole is un use for a portion of the shift 90, or whether the manhole is available for the entire shift 92. Obviously, if the site is in use for the entire shift, a user 16 will not be able to schedule access to the site during that shift without generating a conflict. However, if the site is in use for only a portion of the shift, a user 16 will preferably be able to select the shift, and then be presented with a more detailed breakdown of the shift, such as by the hour, or by the half hour. User 16 will then be able to schedule access to the site during periods of non-use during the shift without generating a conflict. If the site is available for the entire shift, user 16 will be able to schedule access for the entire shift, or for a portion thereof (e.g., by the hour, half hour, etc).

Once scheduling software 60 receives from user 16 a request for access to the site in question at a particular time, scheduling software 60 compares the request with the scheduled maintenance plan for the site in question to determine, at 94, if a scheduling conflict exists. If a conflict is found to exist, scheduling software 60 notifies user 16 of such conflict, and again, at 78, retrieves from schedules database 62 and displays to user 16 the scheduled maintenance plan for the site in question, and prompts user 16 to enter, and receives from user 16, a request for access to the site at a particular time. If no conflict is found to exist, at 94, scheduling software 60 updates, at 96, the scheduled maintenance plan for the site in question on schedules database 62 to reflect the newly scheduled access.

If it is determined, at 72, that the work order is of emergency status, user 16 is not prompted to upload documentation relating to the work order, nor is user 16 prompted to enter any scheduled time periods for access. Instead, scheduling software 60, at 98, updates emergencies database 64 to reflect the emergency, preferably by generating and storing on emergencies database 64 an emergency notification 100 relating to the site in question. This emergency notification may be used in a variety of ways to alert users 16 to the emergency. For example, all emergency notifications 100 may be displayed to users 16 when they log on. Alternately, the display of emergency notifications 100 may be more selective. For example, emergency notifications 100 may be displayed to a user 16 only if that user has an interest in the site to which the emergency notification pertains (e.g., the user has equipment at the site, owns rights to a pathway at the site, etc.), or may be displayed to users if they attempt to schedule access at the site to which the emergency notification 100 pertains.

Referring now to FIGS. 6 through 10, in another aspect, system 10 facilitates the maintenance and creation of pathways between telecommunications sites. As discussed above, each of user telecommunications companies may own the rights to one or more pathways at a particular telecommunications sites, which ownership information for each discrete site may be stored on sites database 36. However, it should be appreciated that in many cases, the telecommunications sites have pathways for running cable or other equipment therebetween, which pathway rights between sites are also owned by the telecommunications companies. For example, and with reference to FIG. 6, a sector 102 may be comprised of a plurality of sites 104, such as manholes. Sector 102 generally comprises a 10×10 grid of manholes, although manholes may not actually be present or available at each grid location (indicated by blacked-out grids). It should also be appreciated that not all manholes may have pathways passing therebetween (e.g., although grid 000 is adjacent 010, there may not be a pathway therebetween), and that users 16 may not own rights in all manholes or between manholes.

In order to facilitate the maintenance and creation of pathways between telecommunications sites, system 10 includes pathway maintenance and creation software 106 and pathways database 108 accessible by computer 12. Pathways database 108 has stored therein information relating to the locations of the various pathways, and which users 16 have ownership rights in which pathways.

Figure 7:
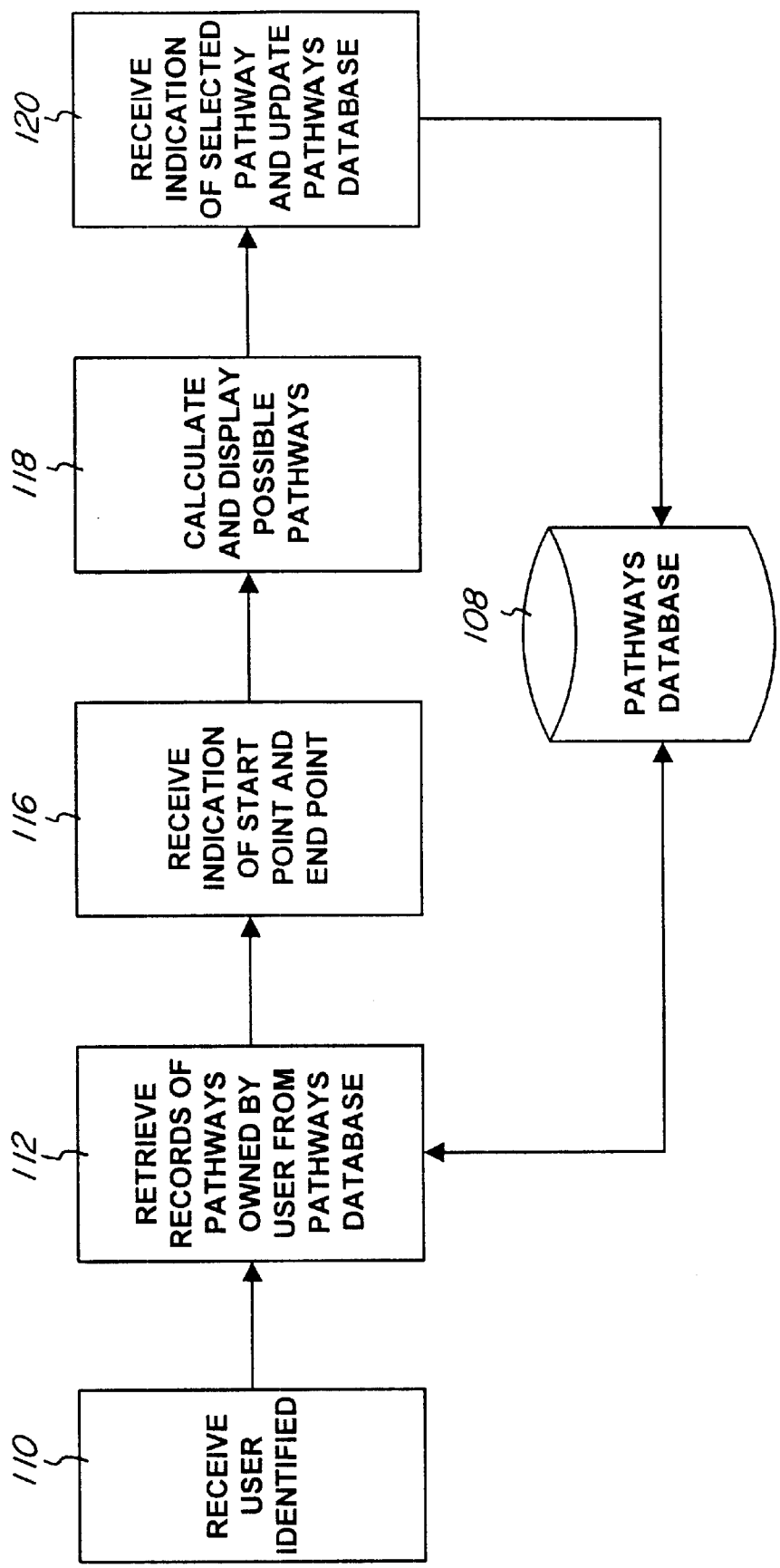
FIG. 7 is a block diagram illustrating the operation of the pathway maintenance and creation software of the system for managing telecommunications infrastructure of FIG. 1.

Referring now to FIG. 7, in order to assist users in planning proposed cable routes, pathway maintenance and creation software 106 first receives, at 110, a user identifier either directly from user 16 or via personalization and permissions software 22. Pathway maintenance and creation software 106 then, at 112, retrieves from pathways database 108 pathway information 114, which comprises indications of pathways between telecommunications sites, and more particularly, a record of pathways between sites in which user 16 has ownership rights. At 116, pathway maintenance and creation software 106 prompts user 16 to enter, and receives from user 16, an indication of a start point and an end point for the cable pathway user 16 is currently planning. Next, pathway maintenance and creation software 106, at 118, calculates and displays possible pathways by which cable can be run by user 16 from the indicated start point to the indicated end point based upon the records of pathways owned by user 16. Pathway maintenance and creation software 106 then, at 120, receives an indication of the selected pathway from user 16, and updates pathways database 108 accordingly by generating a pathway update 122.

Figure 8:
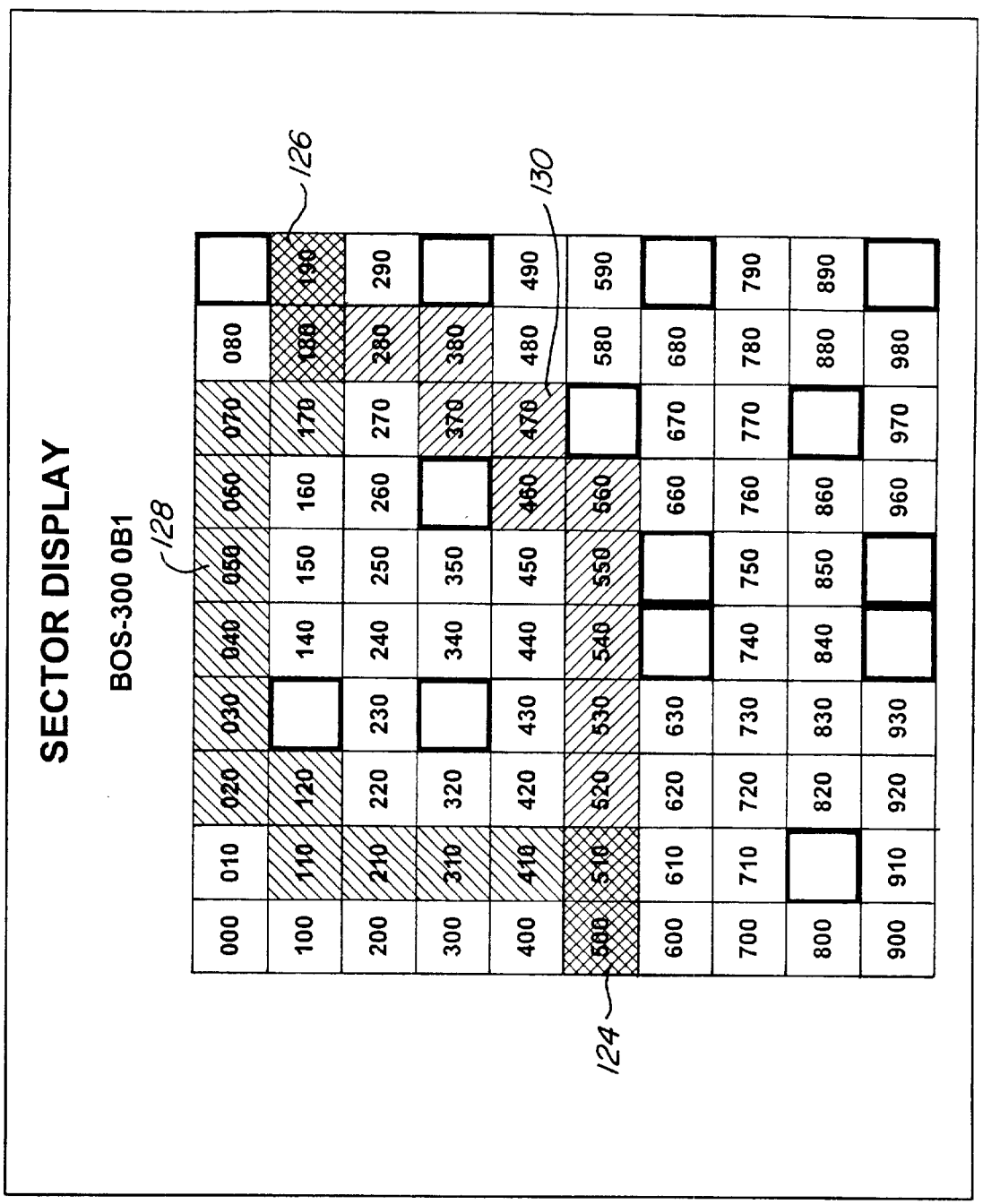
FIG. 8 is a schematic diagram further illustrating operation of the pathway maintenance and creation software of FIG. 7.

With reference now to FIG. 8, a first embodiment of pathway maintenance and creation software 106 will be discussed. In this example, user 16 has selected grid 500 as the pathway start point 124 and grid 190 as the pathway end point 126. Using this information, and the records of pathways owned by user 16, pathway maintenance and creation software 106 calculates one or more pathways 128, 130 between the start point 124 and the end point 126, displays these pathways to user 16, and receives an indication from user 16 as to which of the pathways is selected.

Figure 9:
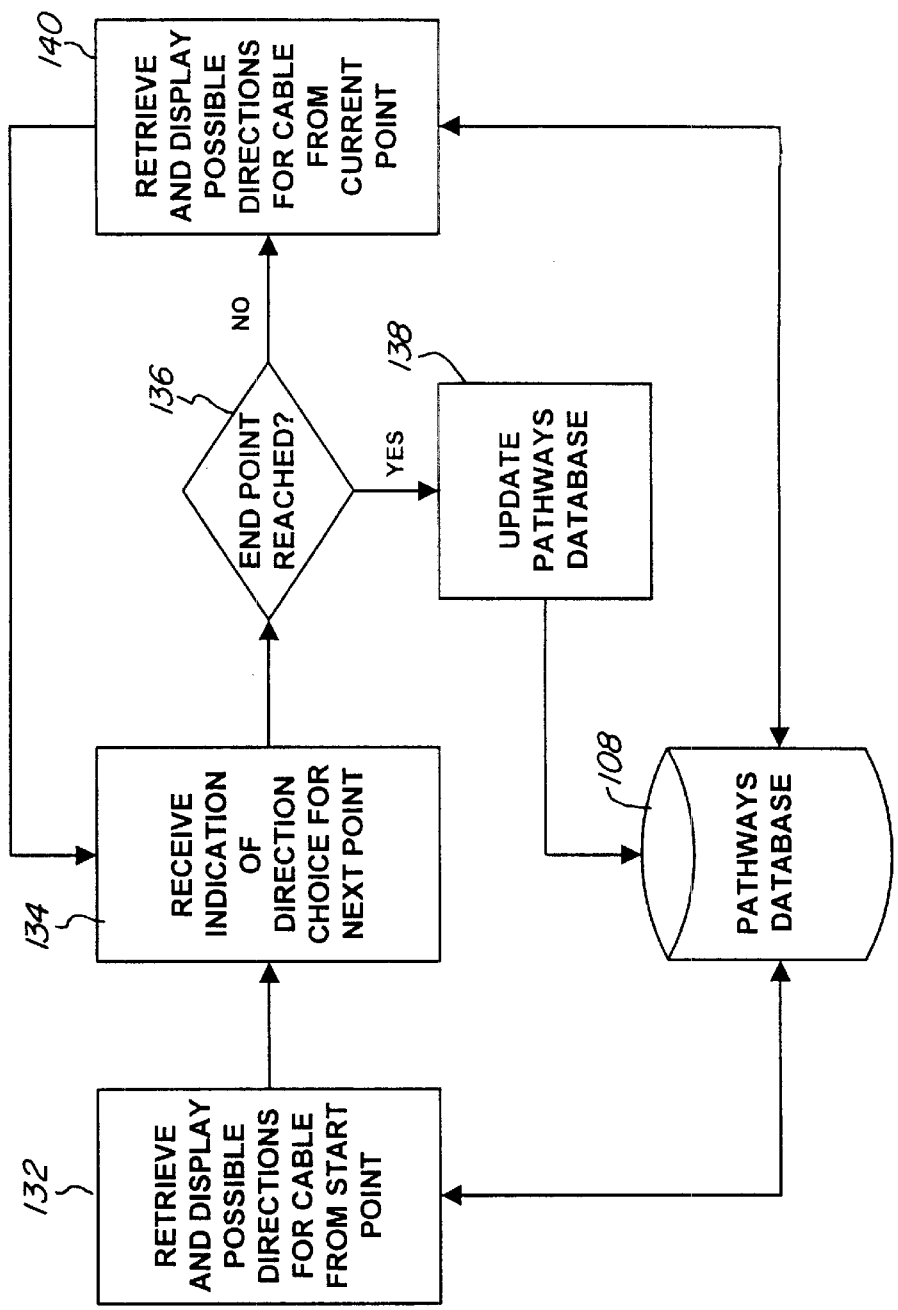
FIG. 9 is a block diagram illustrating in further detail the operation of one embodiment of the pathway maintenance and creation software of FIG. 7.

Referring now to FIGS. 9 and 10, a second embodiment of pathway maintenance and creation software 106 will be discussed. In this example, user 16 has selected grid 500 as the pathway start point 124 and grid 190 as the pathway end point 126. Using this information, pathway maintenance and creation software 106 first, at 132, retrieves from pathways database 108 and displays to user 16 possible directions for the pathway to proceed from the start point 124 (FIG. 10A). Next, pathway maintenance and creation software 106, at 134, receives an indication of the chosen next point from user 16. Suppose in this example that user 16 selects grid 510 as the next site.

Figure 10A:
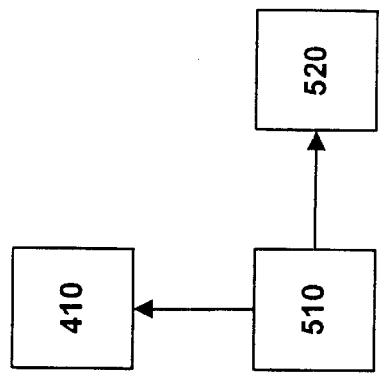
FIGS. 10A through 10D are schematic diagrams illustrating in further detail the operation of the embodiment of the pathway maintenance and creation software of FIG. 9.
Figure 10B:
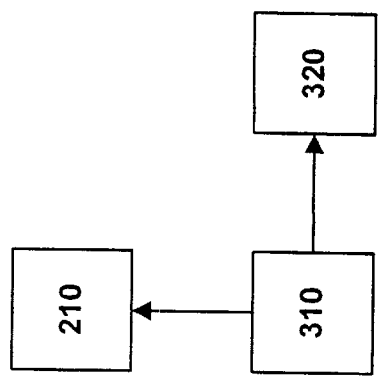
Figure 10C:
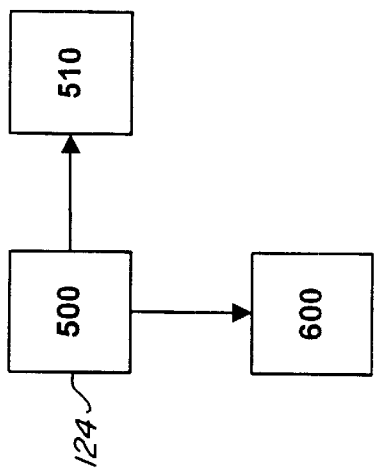
Figure 10D:
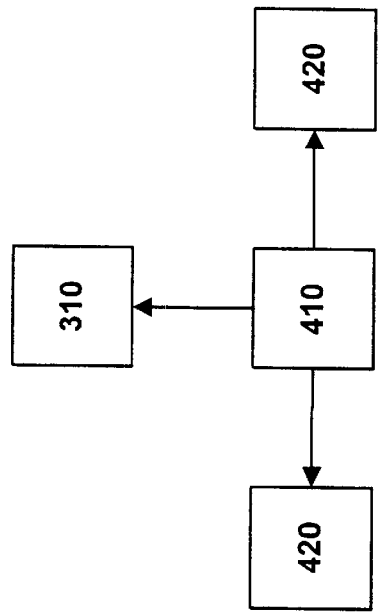

Pathway maintenance and creation software 106 then, at 136, determines whether the end point 126 has been reached. If it has, the pathway is complete, and pathway maintenance and creation software 106 updates, at 138, pathways database 108 to reflect the chosen pathway. If, however, the end point has not been reached, as is the case with the ongoing example, pathway maintenance and creation software 106, at 140, retrieves from pathways database 108 and displays to user 16 possible directions for the pathway to proceed from the current point (i.e., grid 510) (FIG. 10B). Pathway maintenance and creation software 106 then again, at 134, receives an indication of the chosen next point from user 16, and the process is repeated over and over (FIGS. 10C and 10D) until the pathway end point 126 is reached.

The present invention, therefore, provides a system for managing telecommunications infrastructure which automatically manages a plurality of remotely located sites, which monitors what equipment and cables, or which pathways for running cables, are installed, in use, damaged or available for use at any particular site, which automatically manages sites owned, operated and/or serviced by a plurality of system users, and which automatically maintains access schedules for the sites so as to minimize conflicts that may occur when two or more telecommunications companies desire to access the same site.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for managing telecommunications infrastructure comprising:

a computer;

a communications link between said computer and a plurality of users;

a sites database accessible by said computer, said sites database having stored thereon site information relating to a plurality of telecommunications sites, and being accessible by a site identifier;

a schedules database accessible by said computer, said schedules database having stored thereon schedule maintenance plans relating to a plurality of telecommunications sites, and being accessible by a site identifier;

a pathways database accessible by said computer, said pathways database having stored thereon pathway ownership data indicative of which pathways in and between telecommunications sites are owned by which users and which pathways are available for use, said pathway ownership data being accessible by a user identifier;

software executing on said computer for receiving from the plurality of users through said communications link a site identifier indicative of a site of interest, and for retrieving from said sites database and for transmitting to the plurality of users through said communications link information relating to the site of interest;

software executing on said computer for receiving from the plurality of users through said communications link a site update for a site which has been updated, and for updating the site information relating to the updated site on said sites database;

software executing on said computer for receiving from said plurality of users through said communications link a work order for a site to be accessed, said work order comprising a site identifier indicative of the site to be accessed;

software executing on said computer for retrieving from said schedules database and for transmitting to the plurality of users through said communications link a schedule maintenance plan relating to the site to be accessed;

software executing on said computer for receiving from the plurality of users through said communications link an indication of a desired time period for access to the site to be accessed;

software executing on said computer for, if no scheduling conflict is determined to exist, updating the schedule maintenance plan relating to the site to be accessed on said schedules database to reflect the indication of the desired time period for access to the site to be accessed;

software executing on said computer for receiving from said plurality of users through said communications link a user identifier for a particular user;

software executing on said computer for retrieving from said pathways database pathway ownership data indicative of which pathways are owned by the particular user and which pathways owned by the particular user are available for use;

software executing on said computer for receiving from the plurality of users through said communications link an indication of a desired start site and a desired end site for a cable to be run;

software executing on said computer for calculating and transmitting to the plurality of users through said communications link, based upon the desired start site, the desired end site, and the retrieved pathway ownership data, at least one pathway for running the cable, and for receiving an indication from the plurality of users through said communications link of a selected pathway for running the cable; and software executing on said computer for updating the pathway ownership data on said schedules database to reflect the selected pathway for running the cable.

2. The system of claim 1 wherein said work order further comprises an indication of whether the work order relates to an emergency situation, and further comprising:

an emergencies database accessible by said computer, said emergencies database having stored thereon emergency notifications relating to a plurality of telecommunications sites, and being accessible by a site identifier; and software executing on said computer for, if the work order relates to an emergency situation, updating the emergency notification on said emergencies database relating to the site identifier included in the work order to reflect the emergency situation.

3. The system of claim 1 wherein said software executing on said computer for calculating and transmitting to the plurality of users through said communications link, based upon the desired start site, the desired end site, and the retrieved pathway ownership data, at least one pathway for running the cable, and for receiving an indication from the plurality of users through said communications link of a selected pathway for running the cable comprises:

software executing on said computer for transmitting to the plurality of users at least one site to which the cable can be run from the desired start site, and for receiving from the plurality of users an indication of a selected next site; and software executing on said computer for, if the selected end site has not been reached, transmitting to the plurality of users at least one site to which the cable can be run from the desired start site, for receiving from the plurality of users an indication of a selected next site, and for repeating such transmission and receipt until the selected end site has been reached.

4. A system for managing telecommunications infrastructure comprising:

a computer;

a communications link between said computer and a plurality of users;

a sites database accessible by said computer, said sites database having stored thereon site information relating to a plurality of telecommunications sites, and being accessible by a site identifier;

software executing on said computer for receiving from the plurality of users through said communications link a site identifier indicative of a site of interest, and for retrieving from said sites database and for transmitting to the plurality of users through said communications link information relating to the site of interest; and software executing on said computer for receiving from the plurality of users through said communications link a site update for a site which has been updated, and for updating the site information relating to the updated site on said sites database, whereby the system facilitates the management of telecommunications infrastructure by allowing a user to access the most current information available regarding a plurality of telecommunications sites, even if it was another user which was the last to update the sites.

5. The system of claim 4 wherein the site information comprises graphical representations of the current status of the plurality of telecommunications sites.

6. The system of claim 4 wherein the site information comprises photographs of the plurality of telecommunications sites.

7. The system of claim 4 wherein the site information comprises data indicative of the current status of the plurality of telecommunications sites.

8. The system of claim 7 further comprising software for generating, based upon the data indicative of the current status of the plurality of telecommunications sites, graphical representations of the current status of the plurality of telecommunications sites.

9. The system of claim 4 wherein the site information comprises an indication of which equipment and cables are installed at the plurality of telecommunications sites.

10. The system of claim 4 wherein the site information comprises an indication of which pathways are in use, damaged or available at the plurality of telecommunications sites.

11. A system for managing telecommunications infrastructure comprising:

a computer;

a communications link between said computer and a plurality of users;

a schedules database accessible by said computer, said schedules database having stored thereon schedule maintenance plans relating to a plurality of telecommunications sites, and being accessible by a site identifier;

software executing on said computer for receiving from said plurality of users through said communications link a work order for a site to be accessed, said work order comprising a site identifier indicative of the site to be accessed;

software executing on said computer for retrieving from said schedules database and for transmitting to the plurality of users through said communications link a schedule maintenance plan relating to the site to be accessed;

software executing on said computer for receiving from the plurality of users through said communications link an indication of a desired time period for access to the site to be accessed; and software executing on said computer for, if no scheduling conflict is determined to exist, updating the schedule maintenance plan relating to the site to be accessed on said schedules database to reflect the indication of the desired time period for access to the site to be accessed.

12. The system of claim 11 further comprising software executing on said computer for receiving from the plurality of users through said communication link documentation relating to the work order.

13. The system of claim 11 wherein said work order further comprises an indication of whether the work order relates to an emergency situation, and further comprising:

an emergencies database accessible by said computer, said emergencies database having stored thereon emergency notifications relating to a plurality of telecommunications sites, and being accessible by a site identifier; and software executing on said computer for, if the work order relates to an emergency situation, updating the emergency notification on said emergencies database relating to the site identifier included in the work order to reflect the emergency situation.

14. The system of claim 11 wherein the schedule maintenance plans comprise graphical representations of scheduled time periods when the plurality of telecommunications sites are available for access.

15. The system of claim 11 wherein the schedule maintenance plans comprise data indicative of scheduled time periods when the plurality of telecommunications sites are available for access.

16. The system of claim 15 further comprising software for generating, based upon the data indicative of scheduled time periods when the plurality of telecommunications sites are available for access, graphical representations of scheduled time periods when the plurality of telecommunications sites are available for access.

17. A system for managing telecommunications infrastructure comprising:

a computer;

a communications link between said computer and a plurality of users;

a pathways database accessible by said computer, said pathways database having stored thereon pathway ownership data indicative of which pathways in and between telecommunications sites are owned by which users and which pathways are available for use, said pathway ownership data being accessible by a user identifier;

software executing on said computer for receiving from said plurality of users through said communications link a user identifier for a particular user;

software executing on said computer for retrieving from said pathways database pathway ownership data indicative of which pathways are owned by the particular user and which pathways owned by the particular user are available for use;

software executing on said computer for receiving from the plurality of users through said communications link an indication of a desired start site and a desired end site for a cable to be run;

software executing on said computer for calculating and transmitting to the plurality of users through said communications link, based upon the desired start site, the desired end site, and the retrieved pathway ownership data, at least one pathway for running the cable, and for receiving an indication from the plurality of users through said communications link of a selected pathway for running the cable; and software executing on said computer for updating the pathway ownership data on said schedules database to reflect the selected pathway for running the cable.

18. The system of claim 17 wherein said software executing on said computer for calculating and transmitting to the plurality of users through said communications link, based upon the desired start site, the desired end site, and the retrieved pathway ownership data, at least one pathway for running the cable, and for receiving an indication from the plurality of users through said communications link of a selected pathway for running the cable comprises:

software executing on said computer for transmitting to the plurality of users at least one site to which the cable can be run from the desired start site, and for receiving from the plurality of users an indication of a selected next site; and software executing on said computer for, if the selected end site has not been reached, transmitting to the plurality of users at least one site to which the cable can be run from the desired start site, for receiving from the plurality of users an indication of a selected next site, and for repeating such transmission and receipt until the selected end site has been reached.

19. A method for managing telecommunications infrastructure comprising the steps of:

providing a computer;

providing a communications link between the computer and a plurality of users;

providing a sites database accessible by the computer, the sites database having stored thereon site information relating to a plurality of telecommunications sites, and being accessible by a site identifier;

providing a schedules database accessible by the computer, the schedules database having stored thereon schedule maintenance plans relating to a plurality of telecommunications sites, and being accessible by a site identifier;

providing a pathways database accessible by the computer, the pathways database having stored thereon pathway ownership data indicative of which pathways in and between telecommunications sites are owned by which users and which pathways are available for use, the pathway ownership data being accessible by a user identifier;

receiving from the plurality of users through the communications link a site identifier indicative of a site of interest, and retrieving from the sites database and transmitting to the plurality of users through the communications link information relating to the site of interest;

receiving from the plurality of users through the communications link a site update for a site which has been updated, and updating the site information relating to the updated site on the sites database;

receiving from the plurality of users through the communications link a work order for a site to be accessed, the work order comprising a site identifier indicative of the site to be accessed;

retrieving from the schedules database and transmitting to the plurality of users through the communications link a schedule maintenance plan relating to the site to be accessed;

receiving from the plurality of users through the communications link an indication of a desired time period for access to the site to be accessed;

updating, if no scheduling conflict is determined to exist, the schedule maintenance plan relating to the site to be accessed on the schedules database to reflect the indication of the desired time period for access to the site to be accessed;

receiving from the plurality of users through the communications link a user identifier for a particular user;

retrieving from the pathways database pathway ownership data indicative of which pathways are owned by the particular user and which pathways owned by the particular user are available for use;

receiving from the plurality of users through the communications link an indication of a desired start site and a desired end site for a cable to be run;

calculating and transmitting to the plurality of users through the communications link, based upon the desired start site, the desired end site, and the retrieved pathway ownership data, at least one pathway for running the cable, and receiving an indication from the plurality of users through the communications link of a selected pathway for running the cable; and updating the pathway ownership data on the schedules database to reflect the selected pathway for running the cable.

20. The method of claim 19 wherein the work order further comprises an indication of whether the work order relates to an emergency situation, and further comprising the steps of:

providing an emergencies database accessible by the computer, the emergencies database having stored thereon emergency notifications relating to a plurality of telecommunications sites, and being accessible by a site identifier; and updating, if the work order relates to an emergency situation, the emergency notification on the emergencies database relating to the site identifier included in the work order to reflect the emergency situation.

21. The method of claim 19 wherein said step of calculating and transmitting to the plurality of users through the communications link, based upon the desired start site, the desired end site, and the retrieved pathway ownership data, at least one pathway for running the cable, and receiving an indication from the plurality of users through the communications link of a selected pathway for running the cable, comprises the steps of:

transmitting to the plurality of users at least one site to which the cable can be run from the desired start site, and receiving from the plurality of users an indication of a selected next site; and transmitting, if the selected end site has not been reached, to the plurality of users at least one site to which the cable can be run from the desired start site, receiving from the plurality of users an indication of a selected next site, and repeating such transmitting and receiving until the selected end site has been reached.

22. A method for managing telecommunications infrastructure comprising the steps of:

providing a computer;

providing a communications link between the computer and a plurality of users;

providing a sites database accessible by the computer, the sites database having stored thereon site information relating to a plurality of telecommunications sites, and being accessible by a site identifier;

receiving from the plurality of users through the communications link a site identifier indicative of a site of interest, and retrieving from the sites database and transmitting to the plurality of users through the communications link information relating to the site of interest; and receiving from the plurality of users through the communications link a site update for a site which has been updated, and updating the site information relating to the updated site on the sites database, whereby the method facilitates the management of telecommunications infrastructure by allowing a user to access the most current information available regarding a plurality of telecommunications sites, even if it was another user which was the last to update the sites.

23. The method of claim 22 wherein the site information comprises graphical representations of the current status of the plurality of telecommunications sites.

24. The method of claim 22 wherein the site information comprises photographs of the plurality of telecommunications sites.

25. The method of claim 22 wherein the site information comprises data indicative of the current status of the plurality of telecommunications sites.

26. The method of claim 25 further comprising the step of generating, based upon the data indicative of the current status of the plurality of telecommunications sites, graphical representations of the current status of the plurality of telecommunications sites.

27. The method of claim 22 wherein the site information comprises an indication of which equipment and cables are installed at the plurality of telecommunications sites.

28. The method of claim 22 wherein the site information comprises an indication of which pathways are in use, damaged or available at the plurality of telecommunications sites.

29. A method for managing telecommunications infrastructure comprising the steps of:

providing a computer;

providing a communications link between the computer and a plurality of users;

providing a schedules database accessible by the computer, the schedules database having stored thereon schedule maintenance plans relating to a plurality of telecommunications sites, and being accessible by a site identifier;

receiving from the plurality of users through the communications link a work order for a site to be accessed, the work order comprising a site identifier indicative of the site to be accessed;

retrieving from the schedules database and transmitting to the plurality of users through the communications link a schedule maintenance plan relating to the site to be accessed;

receiving from the plurality of users through the communications link an indication of a desired time period for access to the site to be accessed; and updating, if no scheduling conflict is determined to exist, the schedule maintenance plan relating to the site to be accessed on the schedules database to reflect the indication of the desired time period for access to the site to be accessed.

30. The method of claim 29 further comprising the step of receiving from the plurality of users through the communication link documentation relating to the work order.

31. The method of claim 29 wherein the work order further comprises an indication of whether the work order relates to an emergency situation, and further comprising the steps of:

providing an emergencies database accessible by the computer, the emergencies database having stored thereon emergency notifications relating to a plurality of telecommunications sites, and being accessible by a site identifier; and updating, if the work order relates to an emergency situation, the emergency notification on the emergencies database relating to the site identifier included in the work order to reflect the emergency situation.

32. The method of claim 29 wherein the schedule maintenance plans comprise graphical representations of scheduled time periods when the plurality of telecommunications sites are available for access.

33. The method of claim 29 wherein the schedule maintenance plans comprise data indicative of scheduled time periods when the plurality of telecommunications sites are available for access.

34. The method of claim 33 further comprising the step of generating, based upon the data indicative of scheduled time periods when the plurality of telecommunications sites are available for access, graphical representations of scheduled time periods when the plurality of telecommunications sites are available for access.

35. A method for managing telecommunications infrastructure comprising the steps of:

providing a computer;

providing a communications link between the computer and a plurality of users;

providing a pathways database accessible by the computer, the pathways database having stored thereon pathway ownership data indicative of which pathways in and between telecommunications sites are owned by which users and which pathways are available for use, the pathway ownership data being accessible by a user identifier;

receiving from the plurality of users through the communications link a user identifier for a particular user;

retrieving from the pathways database pathway ownership data indicative of which pathways are owned by the particular user and which pathways owned by the particular user are available for use;

receiving from the plurality of users through the communications link an indication of a desired start site and a desired end site for a cable to be run;

calculating and transmitting to the plurality of users through the communications link, based upon the desired start site, the desired end site, and the retrieved pathway ownership data, at least one pathway for running the cable, and receiving an indication from the plurality of users through the communications link of a selected pathway for running the cable; and updating the pathway ownership data on the schedules database to reflect the selected pathway for running the cable.

36. The method of claim 35 wherein said step of calculating and transmitting to the plurality of users through the communications link, based upon the desired start site, the desired end site, and the retrieved pathway ownership data, at least one pathway for running the cable, and receiving an indication from the plurality of users through the communications link of a selected pathway for running the cable comprises the steps of:

transmitting to the plurality of users at least one site to which the cable can be run from the desired start site, and receiving from the plurality of users an indication of a selected next site; and transmitting, if the selected end site has not been reached, to the plurality of users at least one site to which the cable can be run from the desired start site, receiving from the plurality of users an indication of a selected next site, and repeating such transmission and receipt until the selected end site has been reached.

* * * * *